US008578452B2

(12) United States Patent
Lu

(10) Patent No.: US 8,578,452 B2
(45) Date of Patent: Nov. 5, 2013

(54) METHOD FOR SECURELY CREATING A NEW USER IDENTITY WITHIN AN EXISTING CLOUD ACCOUNT IN A CLOUD COMPUTING SYSTEM

(75) Inventor: HongQian Karen Lu, Austin, TX (US)

(73) Assignee: Gemalto SA, Meudon (FR)

( * ) Notice: Subject to any disclaimer, the term of this patent is extended or adjusted under 35 U.S.C. 154(b) by 163 days.

(21) Appl. No.: 13/095,149

(22) Filed: Apr. 27, 2011

(65) Prior Publication Data

US 2012/0278861 A1 Nov. 1, 2012

(51) Int. Cl.
*H04L 29/06* (2006.01)
(52) U.S. Cl.
USPC ............. 726/4; 726/5; 726/6; 726/7; 726/8; 370/352; 370/353; 370/354; 370/355; 370/356; 379/93.02
(58) Field of Classification Search
USPC .......................................................... 726/4
See application file for complete search history.

(56) References Cited

U.S. PATENT DOCUMENTS

| 7,886,038 B2 * | 2/2011 | Ferris ............................ 709/223 |
| 8,170,185 B2 * | 5/2012 | Kutt ............................ 379/93.02 |
| 2011/0209208 A1 * | 8/2011 | Quach et al. ...................... 726/7 |

OTHER PUBLICATIONS

Gopalakrishnan, Anu. "Cloud Computing Identity Management." SETLabs Briefings vol. 7, No. 7, 2009.*

* cited by examiner

*Primary Examiner* — Thanhnga B Truong
*Assistant Examiner* — Narcisco Victoria
(74) *Attorney, Agent, or Firm* — The Jansson Firm; Pehr B. Jansson

(57) ABSTRACT

The invention proposes a method for securely creating a new user identity within an existing cloud account in a cloud computing system, said cloud computing system providing cloud services and resources, said cloud account comprising cloud user identities, said method comprising enabling a first user to access the cloud services and resources using a first security device, wherein it comprises authenticating to the first security device, creating a new user identity within the cloud account for a second user using the first security device.

6 Claims, 2 Drawing Sheets

METHOD FOR SECURELY CREATING A NEW USER IDENTITY WITHIN AN EXISTING CLOUD ACCOUNT IN A CLOUD COMPUTING SYSTEM

FIELD OF THE INVENTION

The present invention relates generally to cloud computing and more specifically to providing a method of managing users, security credentials, permissions, and access for cloud services and resources using portable security devices and to a cloud computing system using such method.

BACKGROUND OF THE INVENTION

Cloud computing enables an on-demand network access to a shared pool of configurable computing resources. It provides scalability, flexibility, and fault resilience. Although cloud computing has becoming increasingly popular, security remains a major issue to be addressed.

A cloud provider is the owner of a cloud. A cloud may consist of many servers providing many services.

One of the most commonly used methods for accessing and managing cloud resources is through an interface called Application Programming Interface (API) offered by cloud providers. For each service request from a client application to the cloud, the API typically mandates client authentication, for which the client application uses or proves the possession of a certain secret, such as a secret access key or a private key associated with an X.509 certificate. Securing these secrets to protect cloud transactions is critical because a stolen key or an unauthorized transaction could lead to direct access to consumers' resources, which could compromise the confidentiality, integrity, and availability of the data and services hosted in the cloud. However, the secure transfer, storage, and usage of the secrets for cloud transactions through API have not been well addressed, which negatively affects the security, usability, and adoption of cloud.

A cloud provider has proposed a new identity and access management service (IAM) that allows customers to manage users and user permissions in their cloud accounts. Before this kind of service is available, a customer with multiple users either has users share the account credentials, such as secret keys, or has multiple accounts at one cloud provider. The IAM allows a customer to create groups and users for accessing the same cloud account. The customer can generate a unique secret key for each user, and manage access rights to cloud services and resources for the groups and users.

Currently creating groups and users, generating unique secret keys, and assigning access permissions involve manual key manipulations. Besides keys are in clear text. An administrator uses for example the account's secret key or his own secret key, if already created, to create a user, a unique secret key, a login credential, and permissions through the cloud API or tools provided by the cloud provider. The administrator gets the user's secret key and login credential from the cloud provider, and gives them to the user so that the user can access the cloud services or resources using the key or the login credential. Nevertheless, such manual key manipulation may be insecure and not user friendly.

There is then a need to provide a solution in order to securely obtain a newly generated secret key and login credential for a new user of an existing cloud account, to securely store the secret keys and login credentials, and to securely provide the secret keys and login credentials to the new user.

SUMMARY OF THE INVENTION

It is then an object of the invention to provide a method of managing users, security credentials, permissions, and access for cloud services and resources using portable security devices.

Thereto, the present invention provides a method for securely creating a new user identity within an existing cloud account in a cloud computing system, said cloud computing system providing cloud services and resources, said cloud account comprising cloud user identities, said method comprising enabling a first user to access the cloud services and resources using a first security device, wherein it comprises authenticating to the first security device, creating a new user identity within the cloud account for a second user using the first security device.

According to another aspect of the invention, the method may comprise registering a second security device to the cloud account using the first security device, associating and enabling the second security device to the new user identity using the first security device.

According to another aspect of the invention, the first user may digitally sign service requests needed for creating the second user identity using the first security device.

According to another aspect of the invention the first user may log into the cloud account through a cloud client application.

According to another aspect of the invention the method may comprise authenticating to the second security device, and interacting with services and resources in the cloud account using the second security device.

According to another aspect of the invention the method may comprise operating the cloud client application and the second security device to update information for the new user identity using the first security device to secure the transactions needed for the operations.

The present invention proposes a method that solve the problems of securely obtaining the newly generated secret key and login credential for a new user of an existing cloud account, securely storing these secrets, and securely giving the secrets to the user, in order to manage users, security credentials, permissions, and access for cloud services and resources.

The invention also provides a cloud computing system providing cloud services and resources, comprising a cloud account for using said cloud services and resources, said cloud account comprising cloud user identities, a first security device enabling a first user to access the cloud services and resources, wherein the cloud account comprises a new user identity created according to the method of the invention.

Thanks to the invention an administrator of the cloud account is able to securely and dynamically set up a new portable security device for a new user.

Thanks to the invention, the new security device contains the secrets for using the cloud services and resources by the new user. Instead of giving the secrets directly to the user, the administrator gives the new security device to the user, or installs the security device to the system if the user is a system. The secrets may include the identification, secret access keys, login credential, certificate and key pairs, permissions, and so on.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawing described below.

DETAILED DESCRIPTION

The present invention may be understood according to the detailed description provided herein.

Figure 1:
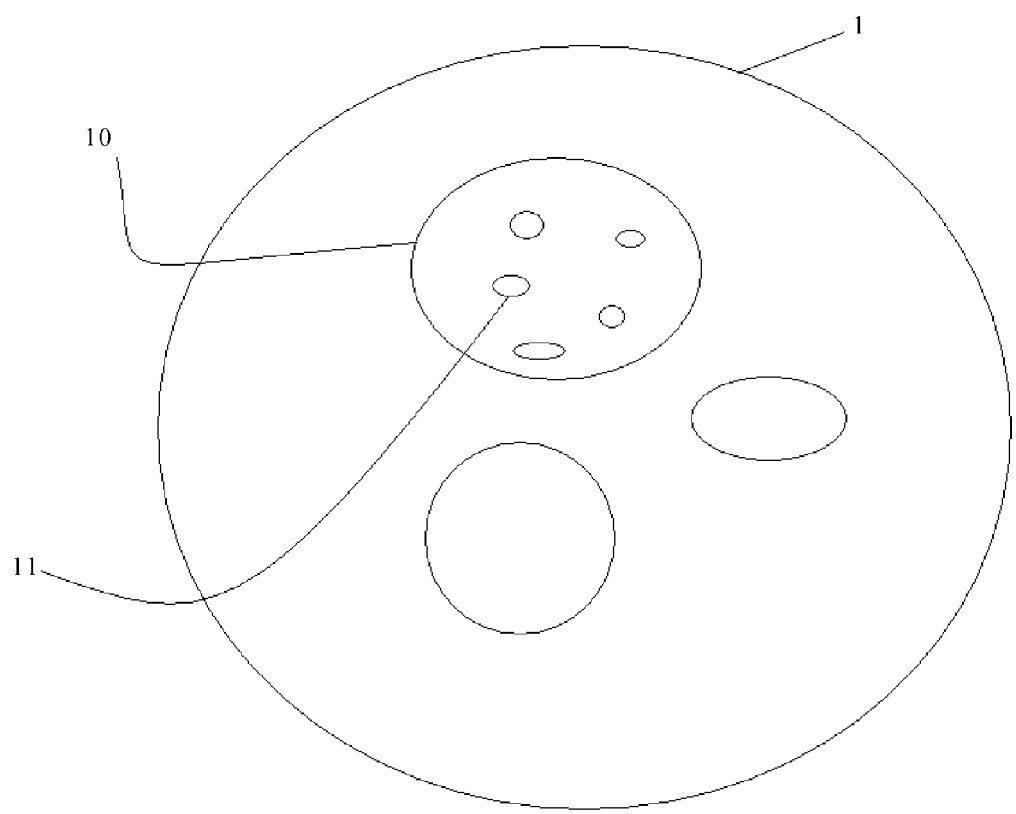
FIG. 1 schematically shows a cloud computing system according to the invention.

Shown in FIG. 1 is a cloud computing system 1 that provides cloud services, comprising but not limited to computing infrastructure, storage, database, various services, identity and access management, and virtual private network.

The cloud computing system 1 comprises a cloud account 10 for using cloud services and resources and for accounting, i.e. billing. A first user identity of the cloud account 10 has for example administrator privileges and belongs to a first user (not represented).

Figure 2:
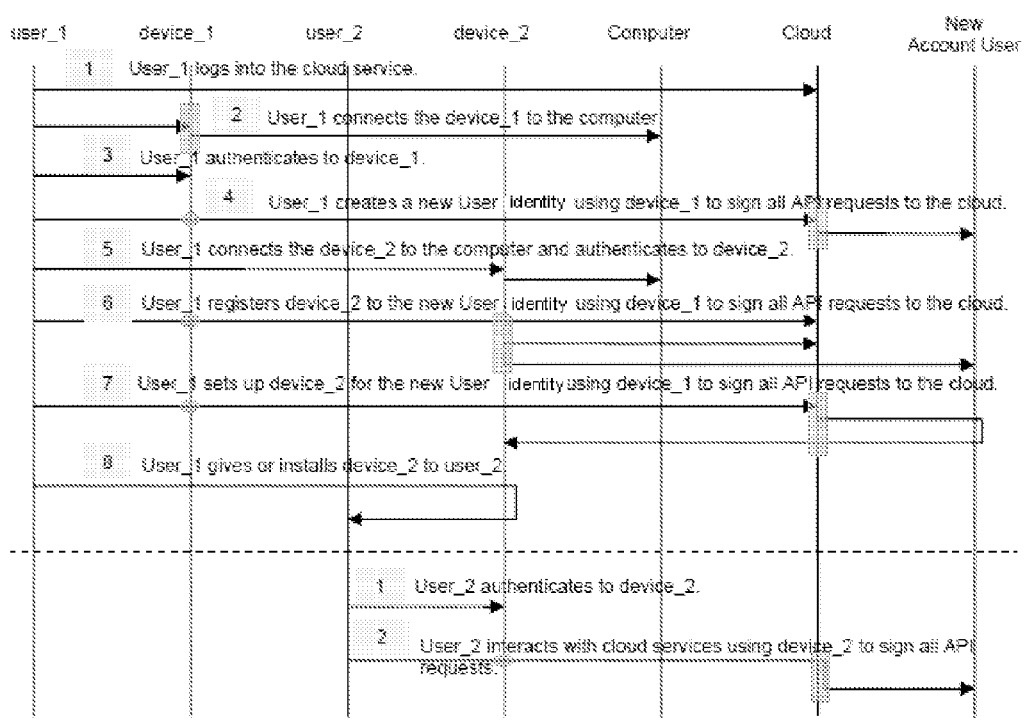
FIG. 2 schematically shows a flowchart of the method according to the invention.

As represented in FIG. 2, the first user using his first user identity, logs into the cloud account 10 through a cloud client application (not represented), also called client application in the description below. The client application may be running in a cloud, in a network outside the cloud such as for example, a corporation's intranet, or on the user's computer. The client application interacts with the cloud services. When the client application itself also runs in a cloud, the cloud may be the same cloud that provide services to the client application, or may be a different cloud.

The first user connects a first security device (FIG. 2, device 1) to his computer if it is not already connected or embedded. The first security device is used by the first user to access the cloud services and resources.

In another step, the first user creates in the cloud account 10 a new user identity 11 for a second user (not represented). For doing so, the first user then authenticates to the first security device. The first user operates through the client application to create a new user identity 11 within the cloud account 10 for the second user using the first security device to secure the transactions needed for creating the new user identity 11. The transactions include services requests from the client application to the cloud through the cloud API. The first security device secures the transactions, for example, by digitally signing the service requests.

In a further step, the first user associates a second security device (FIG. 2, device 2) with the new user identity 11 in the cloud account 10. The first user for example connects the second security device to his computer and authenticates to the second security device. The first user then registers the second security device to the cloud account 10, and associates and enables the second security device to the new user identity 11 created earlier, using the first security device to secure the transactions needed for the operations.

In another step, secret keys, certificates, login credential, permissions, groups, assigning groups, . . . are created or associated by the first user with the new user identity 11 in the cloud account 10. For doing so, the first user operates the client application and the second security device to create or update information for the new user identity 11 and to securely transfer the information necessary for secure accessing the cloud resources to the second security device, using the first security device to secure the transactions needed for the operations.

The first user then gives or installs the second security device to the second user who will use the second security device.

When the second user needs to interacts with the cloud service, he first authenticates to the second security device, and interacts with services and resource in the cloud account 10 using the second security device to secure the transactions needed for the operations.

It will be well understood that the user can be a person, a system, or an application. When the user is a person, he carries his portable security device. When the user is a system or an application, the security device is for example embedded in the system or the system that the application is running.

This method advantageously provides an efficient and secure mechanism by which cloud resources may be securely accessed by multiple users and in which secret keys and login credentials for such users may be created, stored and provisioned to the users.

The invention claimed is:

1. A method for securely creating a new user identity within an existing cloud account in a cloud computing system, said cloud computing system providing cloud services and resources, said cloud account comprising cloud user identities, said method comprising:
enabling a first user to access the cloud services and resources using a first security device;
authenticating the first user to the first security device;
creating a new user identity within the cloud account for a second user using the first security device;
registering a second security device to the cloud account using the first security device; and
associating and enabling the second security device to the new user identity using the first security device.

2. The method according to claim 1, wherein the first user digitally signs service requests needed for creating the second user identity using the first security device.

3. The method according to claim 1, wherein the first user logs into the cloud account through a cloud client application.

4. The method according to claim 1, wherein the method further comprising authenticating to the second security device, and interacting with services and resources in the cloud account using the second security device.

5. The method according to claim 3, wherein the method further comprising operating the cloud client application and the second security device to update information for the new user identity using the first security device to secure the transactions needed for the operations.

6. A cloud computing system providing cloud services and resources, comprising a cloud account for using said cloud services and resources, said cloud account comprising cloud user identities, a first security device enabling a first user to access the cloud services and resources, wherein the cloud account comprises a new user identity created according to the method according to claims 1 to 5.

* * * * *